(12) United States Patent
Kumakura

(10) Patent No.: US 7,764,392 B2
(45) Date of Patent: Jul. 27, 2010

(54) IMAGE TRANSMISSION APPARATUS

(75) Inventor: Shunichi Kumakura, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 946 days.

(21) Appl. No.: 11/586,043

(22) Filed: Oct. 24, 2006

(65) Prior Publication Data

US 2007/0177193 A1 Aug. 2, 2007

(30) Foreign Application Priority Data

Jan. 31, 2006 (JP) ............... 2006-022857

(51) Int. Cl.
*G06F 15/00* (2006.01)
*G06F 15/173* (2006.01)
(52) U.S. Cl. .................... 358/1.15; 709/226
(58) Field of Classification Search ............... 358/1.15, 358/1.16, 1.14, 1.18, 474, 402, 1.13; 709/205, 709/226, 203, 219, 231, 230, 228; 455/414.2, 455/556.1, 73, 550.1, 556.2; 710/33, 104, 710/133; 348/207.99, 207.11, 207.1
See application file for complete search history.

(56) References Cited

U.S. PATENT DOCUMENTS

2001/0052991 A1 * 12/2001 Oomori ............... 358/1.9

FOREIGN PATENT DOCUMENTS

| JP | 09-042530 A | 2/1997 |
| JP | 2002-247388 A | 8/2002 |
| JP | 2003-204426 A | 7/2003 |
| JP | 2004-128879 A | 4/2004 |
| JP | 2005-026978 A | 1/2005 |
| JP | 2006-005635 A | 1/2006 |
| JP | 2007-166321 A | 6/2007 |

OTHER PUBLICATIONS

Japanese Office Action dated Feb. 28, 2008, issued in counterpart Japanese application No. 2006-022857.

* cited by examiner

*Primary Examiner*—Saeid Ebrahimi Dehkordy
(74) *Attorney, Agent, or Firm*—Frishauf, Holtz, Goodman & Chick, P.C.

(57) ABSTRACT

An image transmission apparatus, which is capable of transmitting image data via a network and via a public line, including an image data input section capable of inputting the image data in a color mode and in a monochrome mode; a destination designation section for receiving a destination designation of broadcast transmission; a determination section for determining whether a destination, which is incapable of receiving the image data transmitted via the network, is included in destinations having been received by the destination designation section; and a transmission control section which allows the image data input section to input the image data relating to the broadcast transmission in a monochrome mode, and transmits the image data to each destination of the broadcast transmission, when the determining section determines that the destination incapable of receiving the image data transmitted via the network is included.

27 Claims, 6 Drawing Sheets

BROADCAST TRANSMISSION
RESERVATION REPORT

MULTICASTING ADDRESSES ARE AS
BELOW.

•TRANSMISSION ITEMS    3 ITEMS
    1.Colorfax@Cfx.com
    2.03-1234-5678
    3.fax@Adesign.com

•TRANSMISSION TIME
    2005.11.29   12:00

61 → •TRANSMISSION IMAGE MODE
    MONOCHROME

IMAGE TRANSMISSION APPARATUS

CROSS REFERENCE TO RELATED APPLICATION

The present application is based on Japanese Patent Application No. 2006-022857 filed with Japan Patent Office on Jan. 31, 2006, the entire content of which is hereby incorporated by reference.

BACKGROUND OF THE INVENTION

1. Field of the Invention

The present invention relates to an image transmission apparatus of a facsimile apparatus for sending image data to a designated destination.

2. Description of the Related Art

In recent years, in a facsimile apparatus, in addition to the G3—facsimile utilizing public line, a network facsimile such as an IP (Internet Protocol)—facsimile for transmitting and receiving image data via the Internet has become popular. In the network facsimile, since large quantity of image data can be transmitted through the network facsimile in a high speed with low cost, there is an apparatus, which is capable of transmitting and receiving color images.

Due to the appearance of a color facsimile apparatus, the situation where monochrome facsimile apparatuses and color facsimile apparatuses exist together has appeared. Thus, when using a broadcast function, which is a function for transmitting the same image data to a plurality of destinations with one operation, the possibility that a color facsimile apparatus and a monochrome facsimile apparatus coexist in broadcast destinations occur. In order to appropriately conduct a transmission process, various technologies have been proposed.

For example, Japanese Patent Application open to Public Inspection No. 2005-26978 discloses an Internet facsimile apparatus, which is arranged to read a document in color, to separate the destinations into a color machine group and a monochrome group, to send the read image data to the color machine group as it is and to conduct a color/monochrome conversion before sending the image data to the monochrome group, when a color machine and a monochrome machine coexist in the broadcast destinations and at the same time a color transmission is specified as a transmission mode.

As described above, when conducting the color/monochrome conversion before sending the image, which has been read in color, to the monochrome machine, if a CPU (Central Processing Unit) of the facsimile apparatus conducts the conversion, the processing load of the CPU becomes heavy. Thus, it interferes with the proceedings of the other process and the performance as an apparatus drops down. For example, when receiving a next job reservation operation while conducting the color/monochrome process, hindrances occur that the responses to the operation of the user becomes slow.

FIG. 4 illustrates a conventional mixed broadcast transmission process. According to the conventional process, the CPU reads a document in a color mode (a step S201) and checks whether there is a destination, to which the document needs to be sent in a monochrome mode, in the broadcast destinations (a step S202). When a monochrome exclusive destination coexists with a destination to which the image can be sent in a color mode (the step S202; Y), the image data, which has been read in the color mode, is converted into monochrome image data (color/monochrome conversion) to generate monochrome image data (a step S203).

Then, color image data is transmitted to the destination, which is capable of receiving the color image data (a step S204), monochrome data is transmitted to the monochrome exclusive destination and the process finishes (END). When no monochrome exclusive destination coexists with the destination to which the image can be sent in a color mode (the step S202; N), the CPU transmits the color image data to all the destinations of the broadcast transmission (a step S205) and finishes the process (END). As described above, according to the conventional process, color/monochrome conversion is necessary. Accordingly, there are problems associated with the conventional process that the processing load of the CPU increases due to the color/monochrome conversion and hardware dedicated to the conversion is necessary.

On the other hand, when installing the hardware dedicated to the color/monochrome conversion into the apparatus, the load of the CPU can be reduced. However, it increases the cost of the apparatus. Accordingly, it is difficult to apply the hardware to a less expensive apparatus.

To conduct reading operation of the same document in the color mode and in the monochrome mode twice increases a reading time and makes the operation complicated. Further, since a subtle change of the reading position of the same document makes a document as if which were a different document, it is not preferable to conduct reading operation of the same document twice.

Therefore, it is an object to solve the problems described above to provide an image transmission apparatus, which is capable of conducting broadcast transmission without conducting color/monochrome conversion of image data and without reading operation twice against the same document even when a monochrome exclusive destination (a monochrome destination) coexists with a destination to which the image can be sent in a color mode (a color destination) in the broadcast destinations.

SUMMARY

A configuration reflecting one aspect of the invention to achieve the above-mentioned object is:

An image transmission apparatus, which is capable of transmitting image data via a network and via a public line, the image transmission apparatus including: an image data input section capable of inputting the image data in a color mode and in a monochrome mode; a destination designation section for receiving a destination designation of broadcast transmission; a determination section for conducting a determination whether a destination, which is incapable of receiving the image data transmitted via the network, is included in destinations having been received by the destination designation section; and a transmission control section which allows the image data input section to input the image data relating to the broadcast transmission in a monochrome mode, and transmits the image data to each destination of the broadcast transmission, when the determining section determines that the destination incapable of receiving the image data transmitted via the network is included in the destinations.

A configuration reflecting another aspect of the present invention is:

An image transmission apparatus, which is capable of transmitting image data by using an Internet protocol and transmitting image data by using a facsimile protocol based on T.30, the image transmission apparatus including: an image data input section capable of inputting the image data in a color mode and in a monochrome mode; a destination designation section for receiving a destination designation of broadcast transmission; a determination section for conducting determination whether a destination, which is incapable of receiving the image data by using the Internet protocol, is included in destinations having been received by the destination designation section; and a transmission control section which allows the image data input section to input the image data relating to the broadcast transmission in a monochrome mode, and transmits the image data to each destination of the broadcast transmission, when the determining section determines that the destination incapable of receiving the image data by using the Internet protocol is included in the destinations.

A configuration reflecting another more aspect of the present invention is:

An image transmission apparatus, which is capable of conducting transmission of color image data and transmission of monochrome image data, the image transmission apparatus including: an image data input section capable of inputting the image data in a color mode and in a monochrome mode; a destination designation section for receiving a destination designation of broadcast transmission; a determination section for conducting determination whether a destination, which is incapable of receiving the color image data, is included in destinations having been received by the destination designation section; and a transmission control section which allows the image data input section to input the image data relating to the broadcast transmission in a monochrome mode, and transmits the image data to each destination of the broadcast transmission, when the determining section determines that the destination incapable of receiving the color image data is included in the destinations.

BRIEF DESCRIPTION OF THE DRAWING

These and other objects, advantages and features of the invention will become apparent from the following description thereof taken in conjunction with the accompanying drawings in which:

FIG. 6 illustrates a front view of an example of a broadcast transmission reservation report to be printed out by the MFP, which relates to an embodiment of the present invention.

DETAILED DESCRIPTION OF THE PREFERRED EMBODIMENTS

An embodiment of the present invention will be described by using drawings below.

Figure 1:
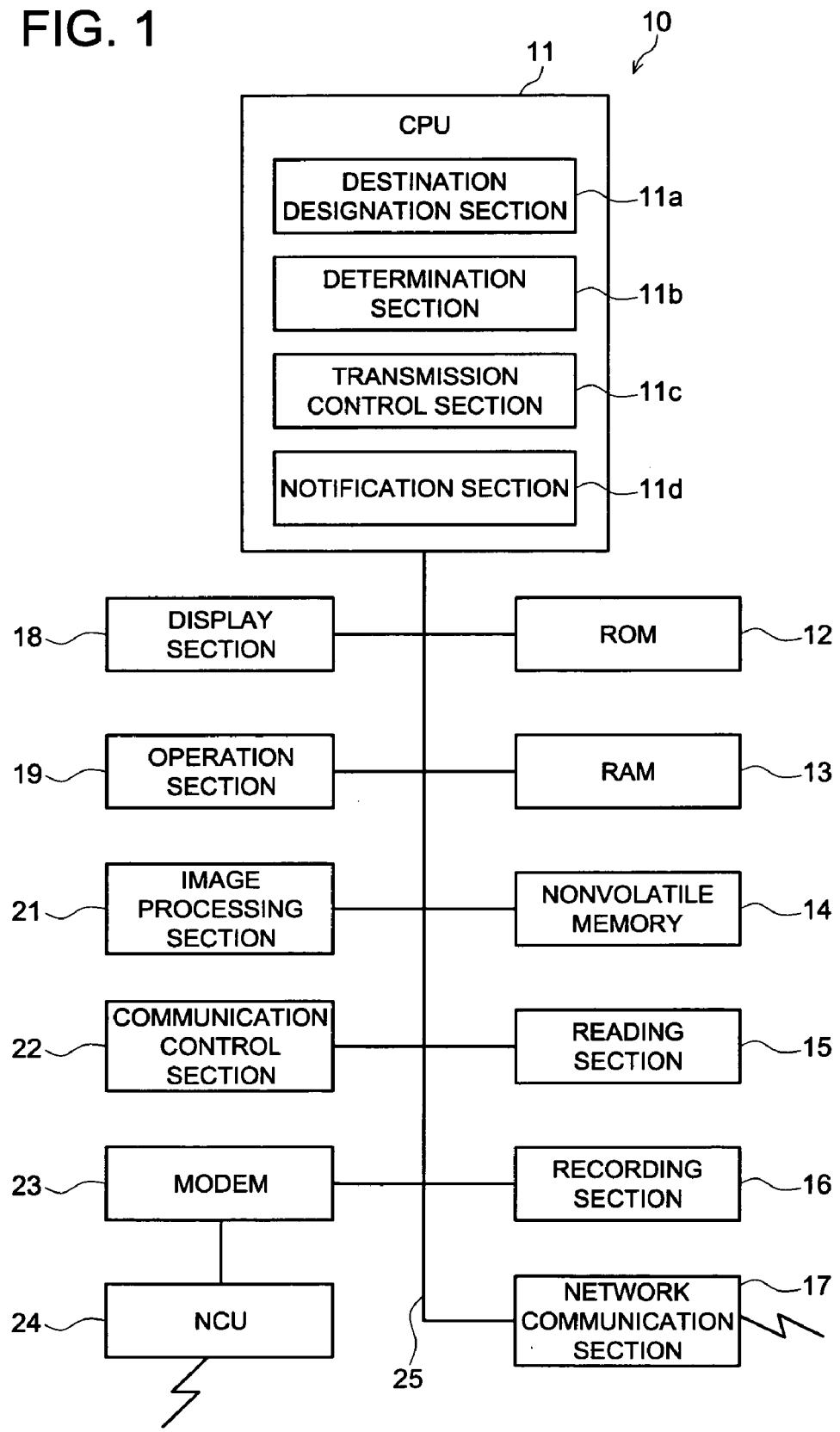
FIG. 1 illustrates a block diagram of a configuration for the MFP (Multi Function Peripheral), which relates to an embodiment of the present invention.

FIG. 1 illustrates a schematic configuration of the MFP (Multi Function Peripheral) 10, as an image transmission apparatus, which relates to an embodiment of the present invention. The MFP 10 includes other than a copy function for scanning a document image and forming a copy of the document image onto a recording paper sheet, a print function for conduct printing based on the print data received from an external terminal and a scanner function for scanning a document image, storing the image data corresponding to the document image and outputting the image data to the external apparatus, and a facsimile function for transmitting and receiving image data via communication network. The MFP 10 is configured as a color machine, which is capable of scanning an image in a color mode, conducting a color print and transmitting and receiving the image data in a color mode.

The MFP 10 comprises a CPU (Central Processing Unit) 11, a ROM (Read Only Memory) 12, a RAM (Random Access Memory) 13, a non-volatile memory 14, a reading section 15, a recording section 16, a network communication section 17, a display section 18, an operation section 19, an image processing section 21, a communication control section 22 and a modem 23, which are connected to bus 25. A NCU (Network Control Unit) 24 is connected with the modem 23.

A CPU 11 plays a role as a control section for totally controlling the operation of the MFP 10. The ROM 12 is a read only memory storing various programs, which have been pre-stored therein. The RAM 13 is used as a work memory for temporarily storing various data when the CPU 11 executes the program stored in the ROM 12 and as an image memory for memorizing image data. The non-volatile memory 14 is a memory for memorizing system settings and destination information, which a user has registered, in a non-volatile state.

The reading section 15 is arranged to optically read a document image and outputting the corresponding image data. The reading section 15 is arranged to have a color mode for reading the document image in color and a monochrome mode for reading the document image in monochrome, the color mode and the monochrome mode being arranged to be switched. The reading section 15 is also arranged to read the image data in the color mode or the monochrome mode according to the instruction from the CPU 11. Namely, the reading section 15 has a role as an input section capable of switching the color mode and the monochrome mode for reading the image data.

The recording section 16 plays a role for forming a color image on a recording paper sheet corresponding to the image data. Here, the recording section 16 is configured as a color laser printer using an electro-photographic process, the color laser printer including a conveyance apparatus for conveying the recording paper sheet, a photosensitive drum, a charging apparatus, a laser unit, a developing apparatus, a transfer-separation apparatus, a cleaning apparatus and a fixing apparatus.

The display section 18 is configured by a liquid crystal display, which displays a setting screen and various screens for user interfaces such as an operation screen. A touch panel provided on the screen of the liquid crystal display and operation switches, which plays a role for receiving various user operations, configures the operation section 19.

The image processing section 21 plays a role for conducting various processes such as magnifying the size of the image, reducing the size of the image, rotating the image, compressing the image data and expanding the image data.

The network communication section 17 plays a role for transmitting and receiving data to or from an external apparatus through network such as LAN (Local Area network). The NCU 24 is a control circuit for connecting the MFP 10 to public line PSTN (Public Switched Telephone Network). The modem 23 is a modulator/demodulator for transmitting and receiving digital data through the analog public line.

The communication control section 22 fills a role of a control function for conducting facsimile communication with an external apparatus by using the network communication section 17, the modem 23 and the NCU 24. In this embodiment, the communication control section 22 are arranged to correspond three types of communication methods such as IP—facsimile, SIP (Session Initiation Protocol)—facsimile and G3—facsimile.

The G3—facsimile is a facsimile communication method based on the Recommendation T.30 of ITU-T (International Telecommunication Union—Telecommunication sector). The public line is used for the communication.

IP—facsimile conducts facsimile transmission by using a protocol such as Recommendation T.37 of ITU-T and an Internet protocol such as SMTP (Simple Mail Transfer Protocol). In T.37, the image data is transmitted and received as an attached file of an electronic mail. The electronic mail to which the image file is attached is transmitted and received via a mail server. IP network is used for the communication.

SIP—facsimile is a facsimile communication method for directly transmitting and/or receiving image data between a transmitter and a receiver with peer to peer through the Internet. In the SIP—facsimile, a server is placed on the network, the server being called a SIP server in which identification information (for example, a telephone number of the facsimile on the public) to identify the facsimile apparatus and an IP destination are correlated and registered. The transmission apparatus sends a connection request to the SIP server with a facsimile number of the party. Then the SIP sever retrieves the IP destination of the destination from the facsimile number received from the transmission apparatus. Then the SIP server connects the transmission apparatus with a reception apparatus. The SIP server is a server for conducting a calling control. The transmission method for the image data after the connection will be separately set. For example, a protocol based on the Recommendation T.38 of ITU-T, and an Internet protocol such as SMTP is used. With regard to the communication, IP network is used.

IP—facsimile and SIP—facsimile are network facsimiles for transmitting and receiving image data via network. The transmission and reception of a color image is available on the network facsimile being IP—facsimile and SIP—facsimile. However, the transmission and reception of a color image is not available with G3—facsimile. On the other hand, the transmission and reception of a monochrome image is available on IP—facsimile, SIP—facsimile and G3—facsimile.

The MFP 10 is arranged to be capable of designating mixed destination having different protocols when designating the destination of the broadcast transmission. Namely, the destination of the network facsimile and the destination of G3—facsimile can be designated together with the destination of the network facsimile in the destinations of the broadcast transmission.

The CPU 11 plays a role as a destination designation section 11a for receiving destination designation of the broadcast transmission, a determination section 11b for determining whether the destination of the network facsimile and the destination of public line (the destination of the G3—facsimile) coexist in the destinations of the broadcast transmission, a transmission control section 11c for allowing the image transmission apparatus to input image data related to the broadcast transmission in a monochrome mode and to transmit the monochrome image data to each destination of the broadcast transmission, when the determination section 11b determines that the destination of the network facsimile and the destination of public line coexist in the destinations of the broadcast transmission, and a notification section 11d for notifying the determination result of the determination section 11b. The destination designation operation for the broadcast transmission is received through the display section 18 and the operation section 19. Further, the destination designation operation for the broadcast transmission may also be received from an external terminal such as a personal computer through the network communication section 17. The notification section 11d controls the display section 18 and the recording section 16 to notify the determination result to the user.

Next, the destination registration of the MFP 10 will be described below.

In a destination registration, there are three types of registration, which are abbreviated destination registration, group destination registration and program destination registration. In abbreviated destination registration, one destination is assigned to each abbreviated number (registration No.). Here, the destination is correlated with receiving capability information corresponding to one abbreviated number. With regard to the receiving capability information, registered are information indicating whether the types of protocol, by which the image data can be received (in this embodiment, three types such as IP/SIP/G3), a facsimile number to be identified (a telephone number), a mail destination and IP destination, a name of the destination, correspond to the type of the apparatus such as a color machine capable of receiving color image data or a monochrome machine, which cannot receive color image data, and information related to the network used when image data is received.

In the group registration, a plurality of abbreviated destinations is correlated with one group name and registered. Other than one destination or equal to or more than two destinations, arbitrary transmission conditions can be registered. A nonvolatile memory 14 memorizes abbreviated destination registration, group destination registration and each registration content of the program destination registration.

Figure 2:
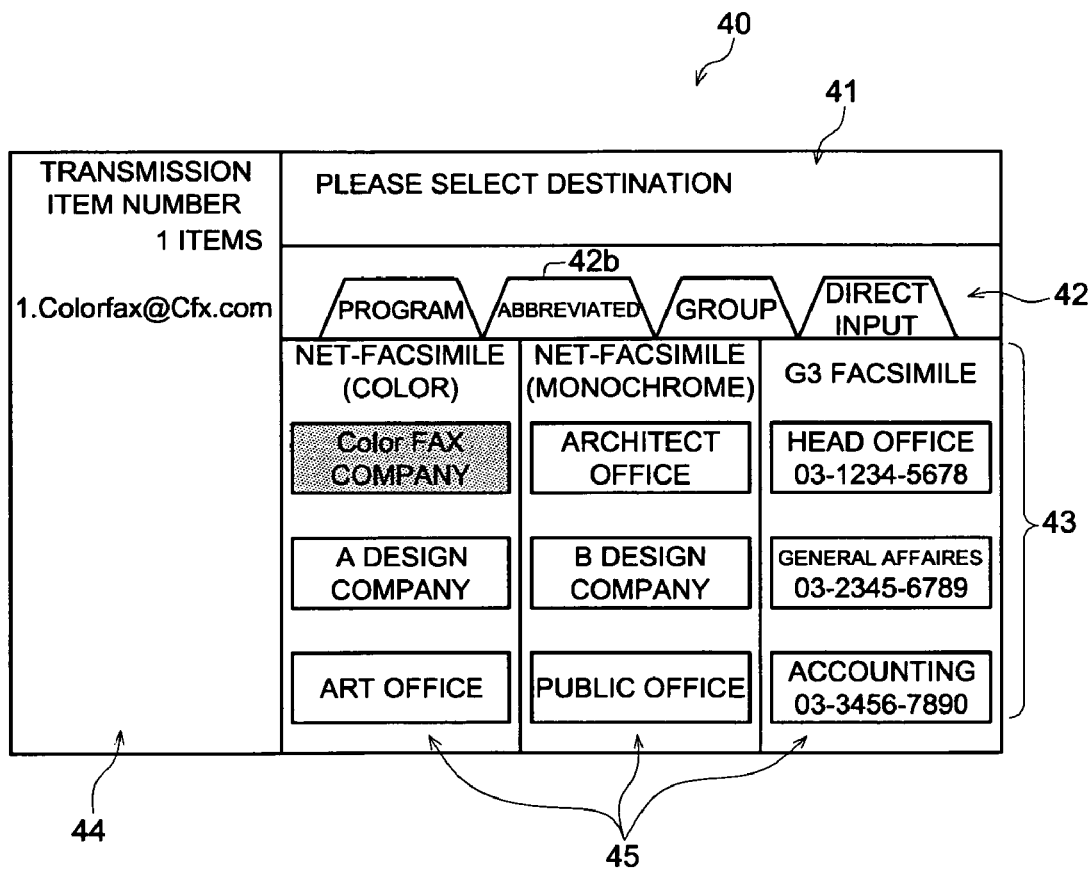
FIG. 2 illustrates a front view showing an example of a destination designation screen displayed in the display section of the MFP, which relates to an embodiment of the present invention.

FIG. 2 illustrates an example of a destination designation screen 40 for designating the destination of the broadcast transmission. In the destination designation screen 40, displayed are a message column 41, on which operation guide and warning messages are displayed, a plurality of tags 42 for selecting the destination selection method, a destination list column 43 for displaying destinations, which can be selected, in a list and a broadcast transmission destination column 44 on which selected destination as the destination of the broadcast destination is listed.

FIG. 2 illustrates a display example when an abbreviated tag 42b has been selected. In a destination list column 43, a destination selection buttons 45 corresponding to the registered and abbreviated destinations are displayed, based on the receiving capability information, which has been registered in correlation with the object destination, the destination selection button 45 being divided into a color network facsimile (in this embodiment, it corresponds to at least IP and SIP, however, it may correspond to G3), a monochrome network facsimile (in this embodiment, it corresponds to at least IP and SIP, however, it may correspond to G3) and a G3—facsimile (in this embodiment, it is impossible for G3—facsimile to receive image data by using IP and SIP protocols). In each destination selection button 45, destination name and a facsimile number corresponding to the abbreviated number are displayed. A user can sequentially select the destination of the broadcast transmission by pressing down an arbitrary selection button 45 displayed in the destination list column 43. In the broadcast destination column 44, the facsimile number and destination information of the selected destination are sequentially displayed. In this embodiment, an example, in which the receiving capability information is registered in correlating with the destination, has been described. However, it may be appropriate to obtain the receiving capability information, which has been obtained as a result of exchanging the data with the party.

Using the group destination and the program destination can also perform the destination designation of the broadcast transmission. Further, the destination designation can be performed by directly inputting the facsimile number. In this case, the protocol type used for the transmission is designated at the same time.

The MFP 10 starts the broadcast process, when the document is placed on a reading section 15; the destination of the broadcast transmission is designated from the destination designation screen 40; and a start button (not shown) is operated.

Figure 3:
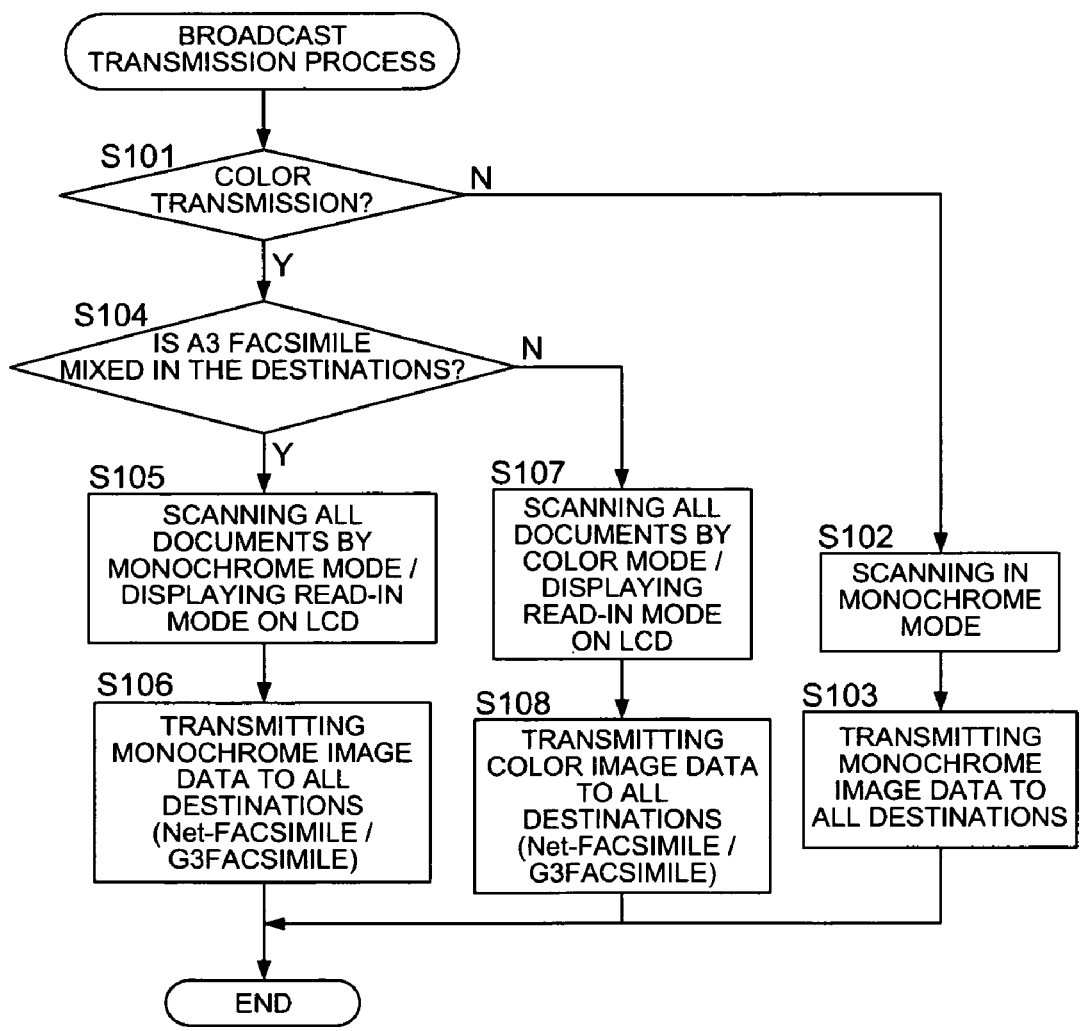
FIG. 3 illustrates a flowchart showing the broadcast transmission process conducted by the MFP, which relates to an embodiment of the present invention.
Figure 4:
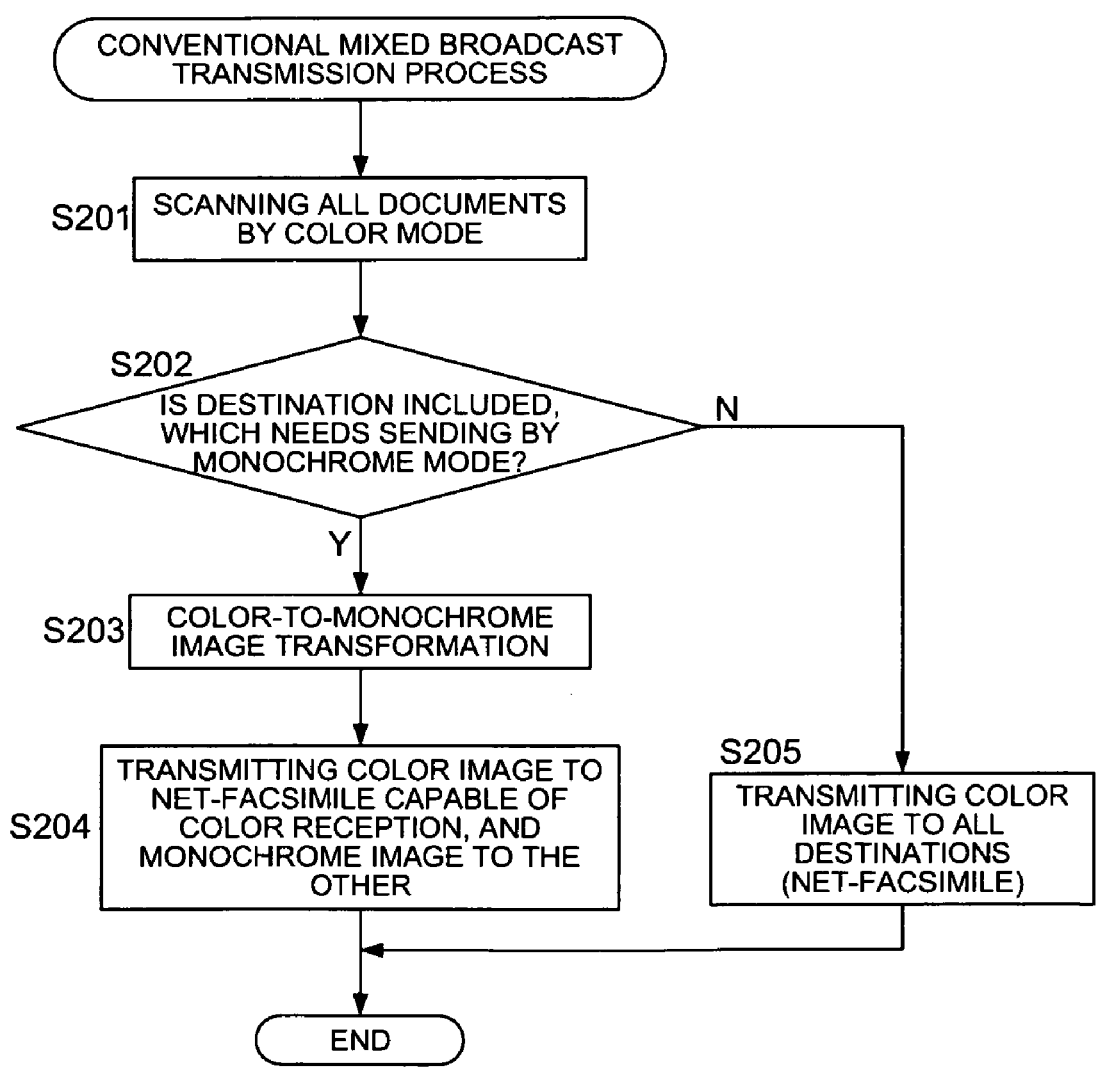
FIG. 4 illustrates a flowchart referring to the process of conventional mixed broadcast transmission.

FIG. 3 illustrates a flowchart of a broadcast transmission process. The CPU 11 determines whether color transmission designation is conducted (a step S101). When no color transmission registration is conducted (the step S101; N), the reading section reads a document in a monochrome mode (a step S102). Then, the CPU 11 transmits the monochrome image data to all destinations of the broadcast destinations (a step S103).

When the color transmission is designated (the step 101; Y), the CPU 11 determines whether the destination of G3—facsimile exists in the destinations of the broadcast transmission (a step S104). When the destination of G3—facsimile exists in the destinations of the broadcast transmission (the step S104; Y), the reading section 15 reads the document in a monochrome mode and the message that the document is read in a monochrome mode is displayed in the display section 18 to notify the fact to the user (a step S105).

Then, the CPU 11 transmits the read monochrome image data to all destinations of the broadcast transmission (a step S106). Namely, even though when a color network destination is included in the destination of broadcast transmission, if a G3—facsimile destination exists in the broadcast destinations, the CPU 11 transmits the monochrome image data read in the monochrome mode to all destinations of the broadcast transmission.

On the other hand, when no G3—facsimile destination exists in the destinations of the broadcast transmission (step S104; N), the reading section 15 reads the document in a color mode and at the same time, the display section 18 displays that the document has been read in the color mode (a step 107). Further, the CPU 11 transmits the color image data read in the color mode to all destinations of the broadcast transmission. (a step S108).

As described above, since when G3—facsimile destination, to which the image data is transmitted via the public line, coexists with the broadcast destinations, the document is read in the monochrome mode so as to transmit the monochrome image data to all destinations, it becomes unnecessary to conduct the process for converting image data from a color format to a monochrome format when transmitting the image data to the G3—facsimile destination, which is different from the conventional case where the image is read in a color mode. Namely, since it becomes possible to prevent the increase of the CPU process load by the color/monochrome conversion and the cost-up of the apparatus caused by the addition of the hardware, which is dedicated for the color/monochrome conversion, a method for realizing the mixed broadcast transmission, which is suitable for a less expensive color image transmission apparatus, can be provided.

Even though when a network destination having a capability of receiving a color image is included in the destinations of the broadcast transmission, in the case that no color transmission is designated, regardless of the coexistence of the G3—facsimile destination, the document is read in a monochrome mode and the monochrome image data is transmitted to the all destinations. Further, even though when network destinations are included in the destinations of the broadcast transmission, in the case that the all destinations are monochrome network destinations and no color network destination is included, regardless of the coexistence of the G3—facsimile destination, the document is read in a monochrome mode and the monochrome image data is transmitted to the all destinations.

Figure 5:
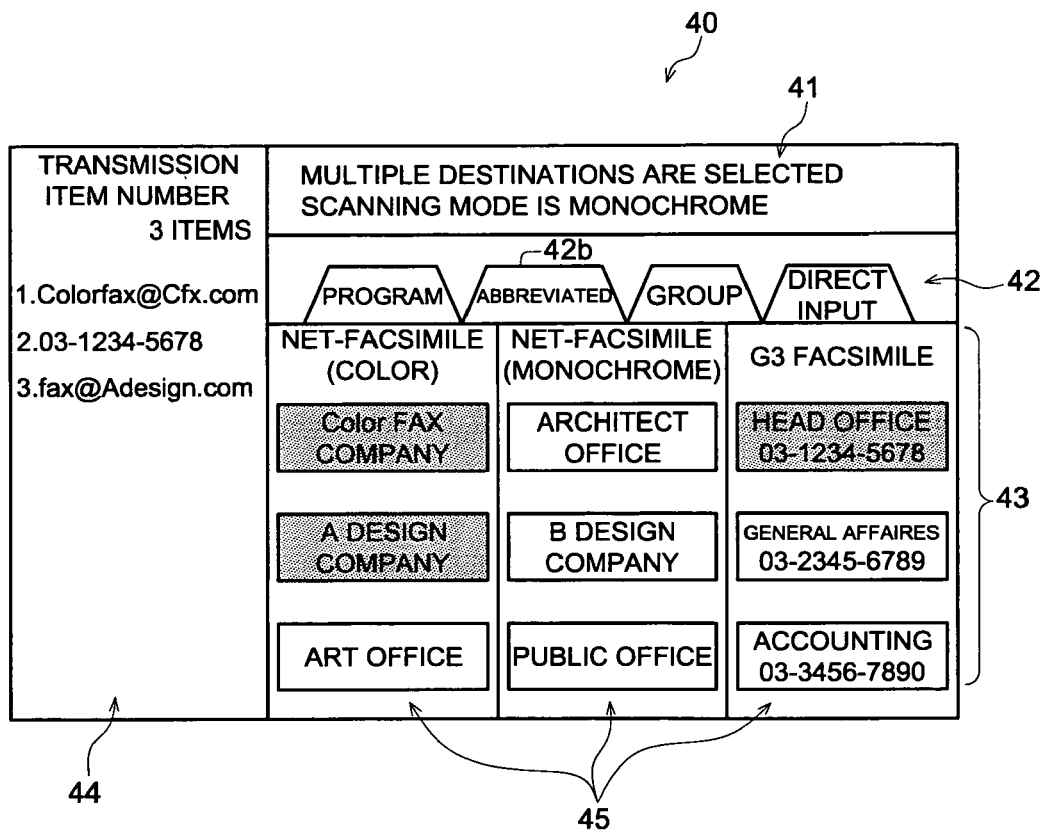
FIG. 5 illustrates a front view of an example of the destination designation screen, in which the guidance that the document will be scanned in the monochrome mode is displayed.

FIG. 5 illustrates a destination designation screen 40 on which the message that a document is read in a monochrome mode is displayed in a message column 41. In FIG. 5, since "Color FAX Company" and "A DESIGN COMPAY", each of them having a network facsimile to which color transmission is available, and "HEAD OFFICE", which is a destination of G3—facsimile, are selected and coexist with the destinations of the broadcast transmission, the message that the document is read in a monochrome mode, is informed.

With regard to the timing for determining the coexistence, the transmission process is arranged to determine the coexistence of different transmission methods after all destinations of the broadcast transmission have been designated and at the time when the start button is pressed down. Then the notification of the coexistence is informed. The transmission process may also be arranged to check the coexistence of the different transmission methods every time when the destination of the broadcast transmission is designated, and notify that the document is read in a monochrome mode to the user when the coexistence occur. For example, in the case of situation of FIG. 5, after "Color FAX Company" and "A DESIGN COMPAY", each of them is a destination of a network facsimile, to which color transmission is available, have been selected, at the time when "HEAD OFFICE", which is a destination of a G3—facsimile, is selected, the message that the document is read in a monochrome mode is sent to the user. It also may be allowed not only to inform that the document is read in a monochrome mode but also to notify the cause of the information.

The message that the document is read in the monochrome mode may be notified by a form of a printed matter of a broadcast reservation report to the user. FIG. 6 is an example of a broadcast transmission report 60, which informs of the read operation in the monochrome mode by displaying "NOMOCHROME" in a transmission image mode column 61.

An embodiment of the present invention has been described. The concrete configuration and the embodiment of the present invention are not limited to the above embodiment and various modifications and additions may be made without departing from the scope of the invention.

For example, in this embodiment, when executing broadcast transmission or designating a destination of the broadcast transmission, the CPU 11 determines whether there is coexistence of a network facsimile destination and a G3—facsimile destination. However, when registering the group destination and the program destination, the CPU 11 may be arranged to determine whether the G3—facsimile destination coexists with the destinations to be registered in the group and destinations to be registered in the program. When the coexistence is identified, the message that the document is read in the monochrome mode and the monochrome image data is transmitted may be notified in the transmission of the group destination and program destination.

Further, when the destination designation is performed by directly inputting a facsimile number, the transmission process may be arranged to determine whether G3—facsimile has been selected as a type of the protocol when the destination is designated.

Conversely, the transmission process may be arranged to conduct determination when an Internet protocol has been selected as a type of the transmission protocol.

The transmission process may be configured, regardless whether the color transmission has been designated or whether the color network destination is included in the broadcast destinations, so as to determine whether a network facsimile destination and a G3—facsimile destination coexist in the broadcast transmission. When the coexistence is confirmed, the document is read in a monochrome mode and the monochrome image data is transmitted to all destinations. According to this method, a determination process becomes easy.

Instead of determining whether the network facsimile destination and a G3—facsimile destination coexist in the broadcast destinations, the transmission process may be arranged to determine whether the G3—facsimile destination exist in the broadcast destinations. Regardless whether the network facsimile destinations exist in the broadcast destinations, if the G3—facsimile destination exits, the transmission process may be arranged so that the document is read in a monochrome mode.

Namely, when at least one or more than one determination criteria from the following criteria is checked; the criteria being that whether a destination, which cannot receive image data via network is included in the broadcast destinations; whether a destination, which cannot receive image data by using Internet protocols, is included in the broadcast destinations; and whether a destination, which cannot receive color image data, is included in the broadcast destinations, and if a destination fulfills one or more than one of the determination criteria described above, the transmission process may be arranged so that the document is read in a monochrome mode, and the read and obtained image data is transmitted to each destination of the broadcast transmission.

Further, when public telephone line is selected as network to be used; when T.30 is selected as the communication protocol; or when a monochrome mode is selected as a transmission mode, instead of conducting determination of the coexistence of the destination as described above, the document image may be arranged to be read in a monochrome mode.

Instead of the determination of the coexistence described above, the transmission process may be arranged to set it as a condition for reading the document in a color mode that there is a designation of color transmission and all destinations are color network destinations. When the condition is not satisfied, the transmission process may be arranged to read the document in a monochrome mode.

The notification that the document is read in a monochrome mode may be sent to the external apparatus. For example, when having received a job of the broadcast transmission from the external terminal by a remote operation, the information may be sent to the external terminal.

In this embodiment, the reading section 15 is arranged to optically read the document image to input the image data. However, as long as the image data can be input in a color mode and a monochrome mode, the image data may be inputted from the external apparatus.

In this embodiment, the present invention is described based on a MFP. However, as long as the apparatus has a broadcast transmission function of image data, it may be a facsimile apparatus. data transmitted via the network is included.

According to the present embodiment described above, when the destination, which cannot receive image data via the network, is included in the destinations of the broadcast transmission, the image data input operation is performed in the monochrome mode and the monochrome image data is transmitted to all the destinations. Since the image data input operation is conducted in the monochrome mode from the beginning, it is not necessary to conduct the color/monochrome conversion when the destinationee posses a monochrome machine. Since the communication speed of the public line is slower than that of an Internet network, and the communication fee is necessary, an apparatus for the public line, the apparatus corresponding to the color transmission and reception, in which the data quantity increase several times comparing with the data quantity of the monochrome transmission and reception, is special and has not become popular. Thus, even when the color destination, which uses the network, is included in the broadcast destinations, if the destination of the public line coexists, the image data is inputted in the monochrome mode and transmitted to all destinations in the monochrome mode.

According to the embodiment described above, when the destination, which cannot receive the image data by using the Internet protocol, is included, image data is inputted in the monochrome mode and the image data is transmitted to all the destinations in a monochrome mode.

According to the invention described above, when the determination section determines that the destination, which cannot receive color image data, is included in the destinations, the image data is inputted in a monochrome mode and the monochrome image data is transmitted to all the destinations.

According to the image transmission apparatus of the present embodiment, the image transmission apparatus determines whether the destination associated with network and the destination associated with the public line coexist in the destinations of the broadcast transmission. When they coexist in the destinations of the broadcast transmission, the image data related to the broadcast transmission is inputted in the monochrome mode and the monochrome image data is transmitted to all destinations of the broadcast transmission. Thus the process for conducting color to monochrome conversion, which is performed prior to the transmission of the image data, which has been scanned in a color mode, to the monochrome destinations, becomes unnecessary. As a result, it become possible to prevent that the process load of the CPU increases. At the same time, it becomes unnecessary to provide hardware dedicated to color to monochrome conversion, which contributes the reduction of the apparatus cost.

What is claimed is:

1. An image transmission apparatus, which is capable of transmitting image data via a network and via a public line, the image transmission apparatus comprising:

an image data input section capable of inputting the image data in a color mode and in a monochrome mode;

a destination designation section for receiving a destination designation of broadcast transmission;

a determination section for conducting a determination whether a destination, which is incapable of receiving the image data transmitted via the network, is included in destinations having been received by the destination designation section; and a transmission control section which allows the image data input section to input the image data relating to the broadcast transmission in a monochrome mode, and transmits the image data to each destination of the broadcast transmission, when the determining section determines that the destination incapable of receiving the image data transmitted via the network is included in the destinations.

2. The image transmission apparatus of claim 1, wherein the determining section determines whether the destination, which is incapable of receiving the image data transmitted via the network is included in the destinations, based on receiving capability information of the destinations.

3. The image transmission apparatus of claim 2, wherein the receiving capability information is information related to a communication line, which is used by each of the destinations when receiving the image data.

4. The image transmission apparatus of claim 2, wherein the receiving capability information is information indicating a type of protocol, which is used by each of the destinations when receiving the image data.

5. The image transmission apparatus of claim 2, wherein the receiving capability information is information indicating whether each of the destinations corresponds to a color machine capable of receiving color image data or a monochrome machine incapable of receiving color image data.

6. The image transmission apparatus of claim 1, wherein the determination section conducts the determination when color transmission is designated as a transmission mode.

7. The image transmission apparatus of claim 1, wherein the determination section conducts the determination when an Internet protocol is selected as a transmission protocol.

8. The image transmission apparatus of claim 1, further comprising a notification section, which notifies a user to the effect that an image data input relating to the broadcast transmission is conducted in monochrome mode, when a result of the determination by the determining section is that the destination incapable of receiving the image data transmitted via the network is included in the destinations.

9. The image transmission apparatus of claim 8, the notification section notifies the user to the effect that an image data input relating to the broadcast transmission is conducted in monochrome mode, by displaying in a prescribed display section or by printing a report with a prescribed printing section.

10. An image transmission apparatus, which is capable of transmitting image data by using an Internet protocol and transmitting image data by using a facsimile protocol based on T.30, the image transmission apparatus comprising:
an image data input section capable of inputting the image data in a color mode and in a monochrome mode;
a destination designation section for receiving a destination designation of broadcast transmission;
a determination section for conducting determination whether a destination, which is incapable of receiving the image data by using the Internet protocol, is included in destinations having been received by the destination designation section; and
a transmission control section which allows the image data input section to input the image data relating to the broadcast transmission in a monochrome mode, and transmits the image data to each destination of the broadcast transmission, when the determining section determines that the destination incapable of receiving the image data by using the Internet protocol is included in the destinations.

11. The image transmission apparatus of claim 10, wherein the determining section determines whether a destination, which is incapable of receiving the image data by using the Internet protocol, is included in the destinations, based on receiving capability information of the destinations.

12. The image transmission apparatus of claim 11, wherein the receiving capability information is information related to a communication line, which is used by each of the destinations when receiving the image data.

13. The image transmission apparatus of claim 11, wherein the receiving capability information is information indicating a type of protocol, which is used by each of the destinations when receiving the image data.

14. The image transmission apparatus of claim 11, wherein the receiving capability information is information indicating whether each of the destinations corresponds to a color machine capable of receiving color image data or a monochrome machine incapable of receiving color image data.

15. The image transmission apparatus of claim 10, wherein the determination section conducts the determination when color transmission is designated as a transmission mode.

16. The image transmission apparatus of claim 10, wherein the determination section conducts the determination when an Internet protocol is selected as a transmission protocol.

17. The image transmission apparatus of claim 10, further comprising a notification section, which notifies a user to the effect that an image data input relating to the broadcast transmission is conducted in monochrome mode, when a result of the determination by the determining section is that the destination incapable of receiving the image data by using the Internet protocol is included in the destinations.

18. The image transmission apparatus of claim 17, the notification section notifies the user to the effect that an image data input relating to the broadcast transmission is conducted in monochrome mode, by displaying in a prescribed display section or by printing a report with a prescribed printing section.

19. An image transmission apparatus, which is capable of conducting transmission of color image data and transmission of monochrome image data, the image transmission apparatus comprising:
an image data input section capable of inputting the image data in a color mode and in a monochrome mode;
a destination designation section for receiving a destination designation of broadcast transmission;
a determination section for conducting determination whether a destination, which is incapable of receiving the color image data, is included in destinations having been received by the destination designation section; and
a transmission control section which allows the image data input section to input the image data relating to the broadcast transmission in a monochrome mode, and transmits the image data to each destination of the broadcast transmission, when the determining section determines that the destination incapable of receiving the color image data is included in the destinations.

20. The image transmission apparatus of claim 19, wherein the determining section determines whether a destination, which is incapable of receiving the color image data, is included in the destinations based on receiving capability information of the destinations.

21. The image transmission apparatus of claim 20, wherein the receiving capability information is information related to a communication line, which is used by each of the destinations when receiving the image data.

22. The image transmission apparatus of claim 20, wherein the receiving capability information is information indicating a type of protocol, which is used by each of the destinations when receiving the image data.

23. The image transmission apparatus of claim 20, wherein the receiving capability information is information indicating whether each of the destinations corresponds to a color machine capable of receiving color image data or a monochrome machine incapable of receiving color image data.

24. The image transmission apparatus of claim 19, wherein the determination section conducts the determination when color transmission is designated as a transmission mode.

25. The image transmission apparatus of claim 19, wherein the determination section conducts the determination when an Internet protocol is selected as a transmission protocol.

26. The image transmission apparatus of claim 19, further comprising a notification section, which notifies a user to the effect that an image data input relating to the broadcast transmission is conducted in monochrome mode, when a result of the determination by the determining section is that the destination incapable of receiving the color image data is included in the destinations.

27. The image transmission apparatus of claim 26, the notification section notifies the user to the effect that an image data input relating to the broadcast transmission is conducted in monochrome mode, by displaying in a prescribed display section or by printing a report with a prescribed printing section.

* * * * *